Nov. 7, 1967  O. VON ZELEWSKY ETAL  3,351,512
DEVICE FOR INTERCONNECTING TWO PIPES OF THERMOPLASTIC MATERIAL
Filed Oct. 21, 1963  4 Sheets-Sheet 1
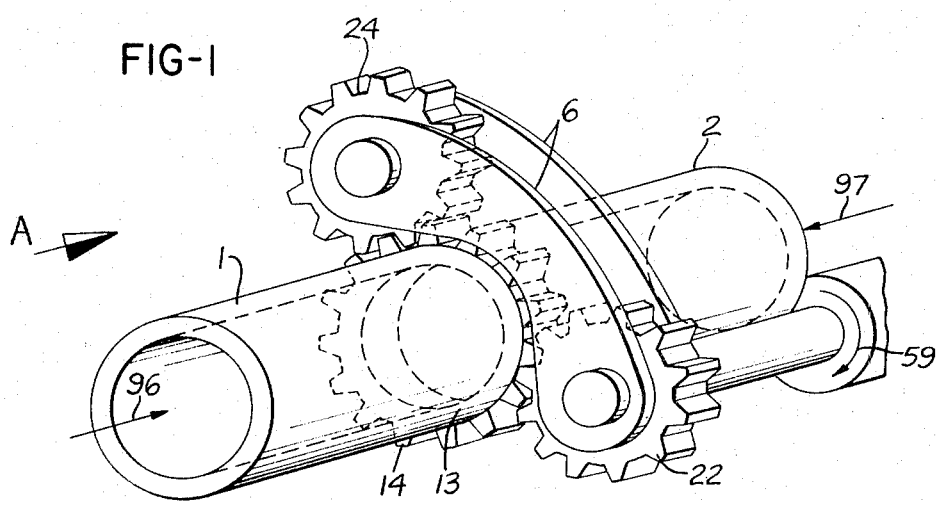
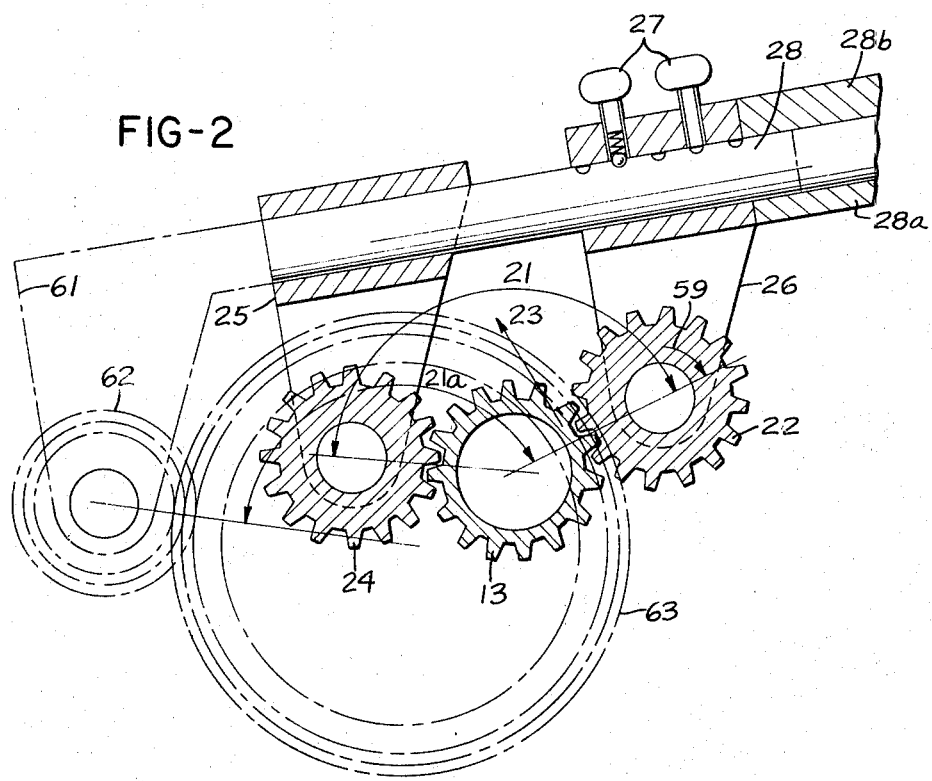
INVENTORS:
Ottomar von Zelewsky
Werner Burkert
BY

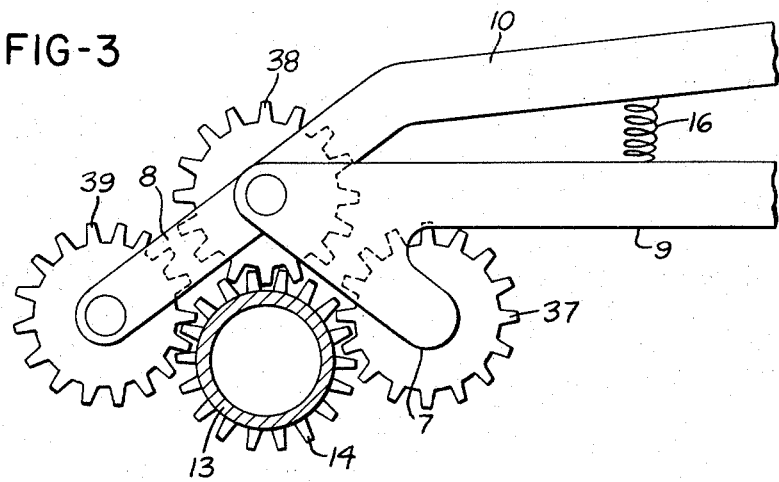
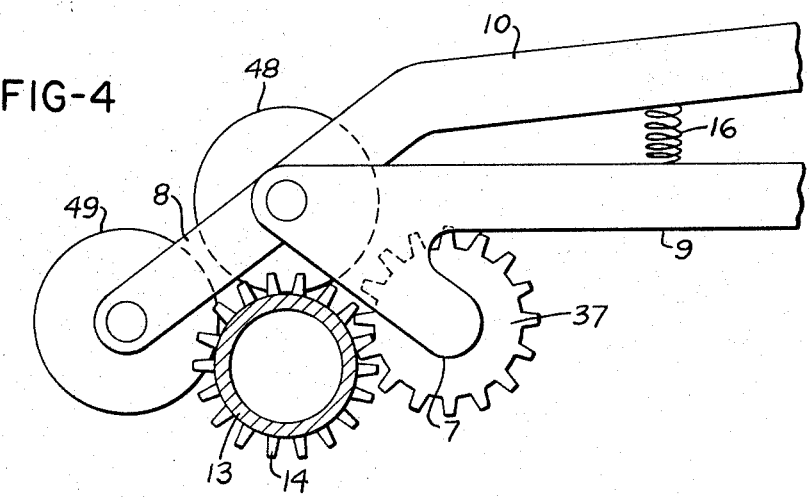

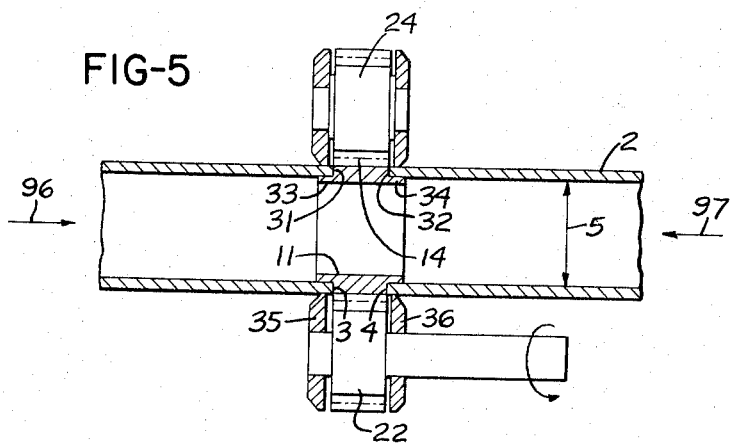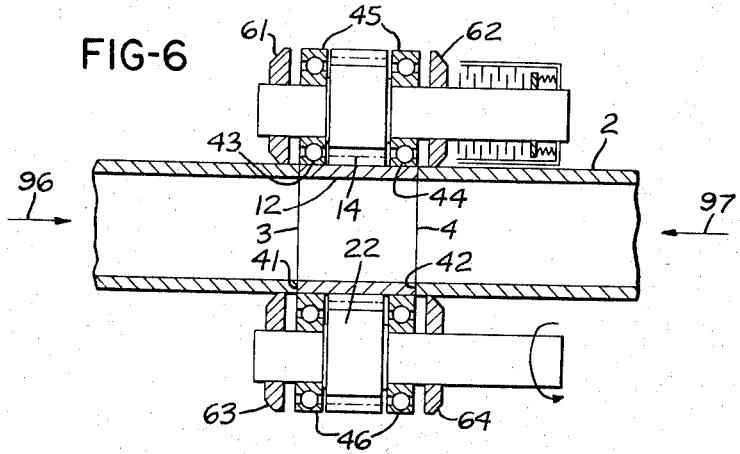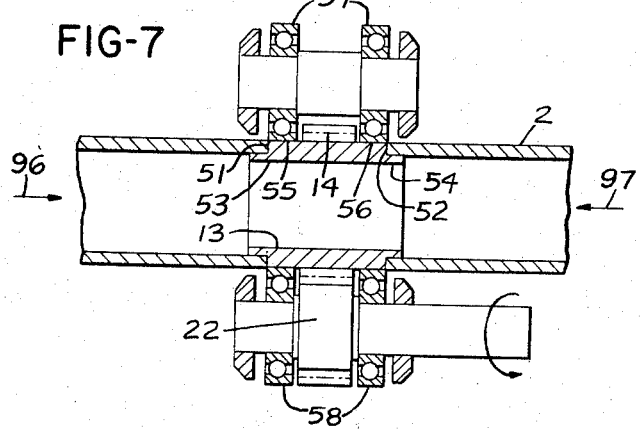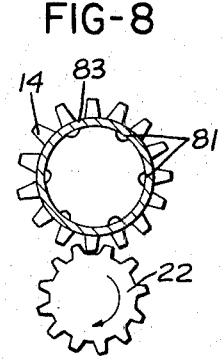

United States Patent Office 3,351,512
Patented Nov. 7, 1967

3,351,512
DEVICE FOR INTERCONNECTING TWO PIPES OF THERMOPLASTIC MATERIAL
Ottomar von Zelewsky, Neuhausen am Rheinfall, and Werner Burkert, Schaffhausen, Switzerland, assignors to Georg Fischer Aktiengesellschaft, Schaffhausen, Switzerland
Filed Oct. 21, 1963, Ser. No. 317,735
2 Claims. (Cl. 156—580)

The present invention relates to a method of and device for connecting pipes and connecting members of thermoplastic material by spin welding. Methods and devices for this purpose have been known heretofore. According to some heretofore known methods, one of the parts to be connected while in frictional engagement with the other part to be connected is turned relative thereto, so that sufficient frictional heat will develop between the frictionally engaging surfaces and melt the same and fuse the melted sections together. This method is, of course, not applicable when the parts to be connected are of such a design, for instance include curved portions, that they cannot be turned.

Therefore, a method has been developed which makes it possible to connect two stationary members by thermoplastic spin welding. According to this last-mentioned method, a connecting wedge-shaped ring is interposed between the outer wall surface of a cylindrical pipe end and a conical sleeve of the other pipe end. This wedge-shaped ring is fitted into the thus created groove and has one end provided with bevel teeth adapted to be engaged and rotated by a bevel gear transmission. The said wedge ring is thus in frictional engagement with the two pipes to be interconnected and by rotating the same at a corresponding speed, sufficient heat will be developed for melting portions of the ring and adjacent pipes so as to effect a fusing between the ring and the pipes, therefore interconnecting the pipes. With this method the said wedge ring does not form a part of the inner wall surface of the thus created pipe system.

The last-mentioned arrangement has the drawback that the pressure, as a rule, is unevenly distributed with regard to the conical surface engaging the sleeve portion of one tubular member and the cylindrical portion engaging the adjacent cylindrical surface of the other tubular member. In view of these circumstances, it usually happens that the conical surface begins to melt before the cylindrical surface starts melting and it might even happen that the conical surface has completely melted and fused whereas the fusing of the cylindrical surface has not even started.

In order to rotate the said wedge-shaped ring, it is furtheremore necessary to provide a sleeve made of two halves with a two-part bearing and bevel gear transmission and to place this arrangement over one of the pipes. Such axially divided gears are highly sensitive machine elements, particularly when they have repeatedly and quickly to be disassembled and reassembled. As a matter of fact, it is almost impossible to design a reliable quick closure for a two-part bevel gear.

A further drawback of the above-mentioned arrangement consists in that a bearing requires a minimum free space around the pipe. Thus, behind the pipe, for instance, between a pipe and a wall, a space has to be left for the tool.

It is, therefore, an object of the present invention to provide a method of and device for interconnecting pipes and similar parts of thermoplastic material, which will overcome the above-mentioned drawbacks.

It is still another object of this invention to provide a method and device of the above-mentioned type in which the welding or fusing surface will be geometrically and mechanically determined so that a warp-free and improved fusing and connection will be assured.

It is another object of this invention to provide a method and apparatus of the type set forth in the preceding paragraph which will permit the employment of small tools so as to allow the connection of tubular members at difficult accessible portions thereof.

It is still another object of this invention to provide a method and device of the above-mentioned character which will avoid two-part driving elements.

These and other objects and advantages of the invention will appear more clearly from the following specification in connection with the accompanying drawings, in which:

FIGURE 1 represents an axonometric diagrammatic sketch of a device for carrying out the method according to the present invention;

FIGURE 2 is a cross-section through a modification of a device for carrying out the method according to the invention, said device being shown in two different positions indicated in full lines and dot-dash lines, respectively;

FIGURE 3 is a top view of a further modification, which differs from the modifications of FIGURES 1 and 2 in that it employs a greater number of gears than the latter;

FIGURE 4 is a top view of still another modification employing one gear and two rollers;

FIGURE 5 is a diagrammatic longitudinal section through still another modification without lateral guiding rollers;

FIGURE 6 represents a longitudinal section through a modification with lateral guiding rollers;

FIGURE 7 is a section through an arrangement similar to that of FIGURE 6 but with a slightly modified intermediate member between the two pipe sections;

FIGURE 8 is a partial cross-section through an embodiment with centering knobs;

Figure 9:
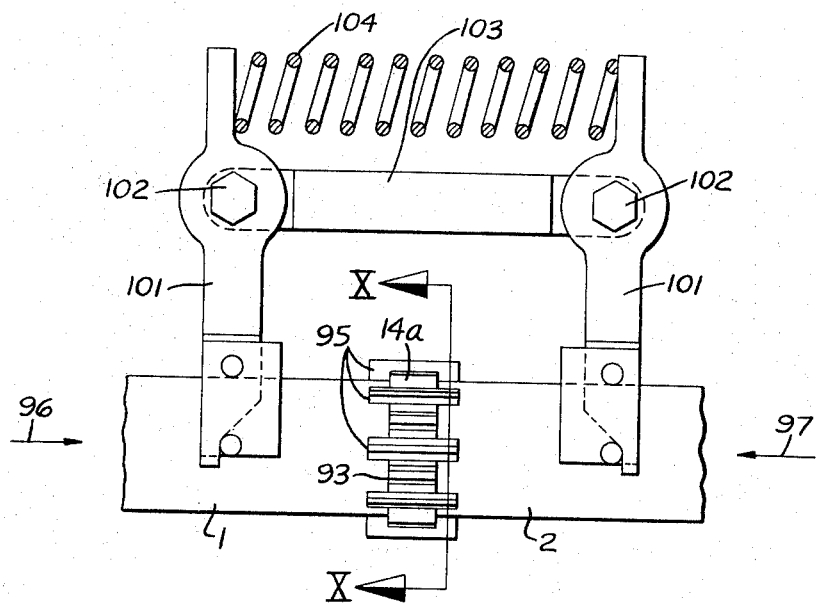
FIGURE 9 is a top view of a modification with outer centering means; and showing means for effecting axially directed forces upon the pipe ends.

The present invention is characterized primarily in that for purposes of connecting the two pipe ends or similar parts of thermoplastic material, an annular intermediate member of the same or similar thermoplastic material is interposed between said two pipe ends so that the end faces of said interediate member engage the respective adjacent end faces of the pipe ends to be interconnected. Furthermore, the said intermediate member is provided with peripheral teeth adapted to mesh and be driven by corresponding gear means so that fusion heat will be created between the engaging end surface of said intermediate member and the pipe ends whereby a reliable and improved intrconnection of said pipe ends will be effected.

The gear means for rotating said intermediate member is advantageously formed by an arrangement which can be placed against the gears of said intermediate member without requiring slipping over the pipes and the intermediate member.

Referring first to FIGS. 5 to 8 best illustrating the method according to the present invention, these figures show two pipe sections or pipe ends 1 and 2 to be interconnected. As will be seen from the drawings, the end faces 3 and 4 of the pipes 1 and 2 are cut substantially perpendicular to the axes of said pipe. However, minor angle deviations are admissible. Furthermore, instead of having the end faces of the pipes substantially perpendicular to the axes of the pipes, they also may be conical.

The intermediate member 11 (FIG. 5), 12 (FIG. 6)

and 13 (FIG. 7) between the pipes to be interconnected consists primarily of a tubular member having its outer wall surface provided with cylindrical spur teeth 14. These teeth preferably have a modulus 2 so that they represent relatively rough teeth. The diameter of the addendum circle or crown line may be somewhat smaller with regard to the diameter of standard teeth. Instead of the illustrated spur gear teeth, they may also advantageously be applied to other types of teeth as for instance herringbone teeth. The cylindrical intermediate sections 11, 12, 13 consist of thermoplastic material similar to the thermoplastic material of pipes 1 and 2 and form a portion of the pipe proper after the pipes 1 and 2 have been interconnected. In other words, the inner wall of the intermediate member 11, 12, 13, forms a portion of the inner wall of the pipe assembly and does so over the entire length of said intermediate member in contrast to heretofore known arrangements.

The fusing surfaces proper 31 and 32 (FIG. 5), 41 and 42 (FIG. 6), 51 and 52 (FIG. 7) are substantially perpendicular or slightly conical with regard to the axis of the intermediate member and the pipes. For purposes of an improved centering of the work pieces prior to the interconnection thereof, the cylindrical intermediate member 11 (FIG. 5), 13 (FIG. 7) is provided with a protruding cylindrical guiding lip 33 and 34 (FIG. 5), 53 and 54 (FIG. 7). This guiding lip may be rather short but for purposes of a clearer illustration has been shown relatively long at FIGS. 5 and 7. The outer diameter of these guiding lips 33, 34, 53, 54 (FIGS. 5 and 7) should have a slight play relative to the inner diameter 5 of the pipe so that the fusing will take place only at the fusing surfaces 31, 32 (FIG. 5) 51, 52 (FIG. 7). Instead of the said guiding lips or centering lips having the shape of a closed cylinder, it is also possible to provide a few profiled ribs or cams 81 according to FIG. 8 which project from the end of the annular member but which do not extend all the way around in an uninterrupted manner but are spaced circumferentially from each other so as not to interfere with the flow through the annular member.

In conformity with FIG. 6, it is also possible to omit such centering lips altogether and to select the inner diameter of the intermediate member 12 in conformity with the inner diameter of the pipes 1 and 2 provided that means be employed for instance on the tool such as rollers for centering the intermediate member.

The turning of the intermediate member 11 (FIG. 5), 12 (FIG. 6) 13 (FIG. 7) with regard to the stationary pipe ends 1 and 2 may be effected by any suitable means such as transmissions in which at least one spur gear 22 meshes with teeth 14 of the intermediate member 11, 12 or 13. According to a particularly advantageous feature of the present invention, a two-axis tool is employed in which the connecting lines of the projections of the axes of the tool with the projection of the axis of the pipes confines an angle 21 (see FIG. 2). This angle 21 which may be termed "position angle" preferably amounts to 120° but, at any rate, is less than 180°.

The driving elements for the tool have, for purposes of a simplified illustration, been illustrated as being spaced from each other by a fixed distance. In order to be able by means of one and the same tool to handle a great number of different pipe diameters, it is preferable to design the driving members or gear transmission in conformity with the principle of an adjustable clamp as shown in FIG. 2. The intermediate member 13 meshes with the driving gear 22. Gear 22 in its turn is driven by a prime mover in the direction of rotation indicated by the arrow 59. The tooth force 23 has the tendency to press the intermediate member 13 against the non-driven counter gear 24 and to radially center the intermediate member 13 with regard to the pipes to be interconnected.

In this way, with regard to FIG. 2 the intermediate member is being centered by supporting itself along three lines namely (a) the flank contact lines of the teeth pertaining to gear 22 and intermediate member 13,
(b) the contacting line between the flanks of intermediate member 13 and gear 24, and
(c) the contacting line between the lip of the intermediate member and the respective adjacent pipe sections.

The adjustable wheel is journalled in displaceable leg 25 of the clamp and is adapted to be adjusted relative to a fixed leg 26 having journalled therein the driving gear 22. After the adjustable wheel has been adjusted, it is arrested in its respective position to which end clamping screws 27 are tightened which engage a shaft 28 having fixedly connected thereto the leg 25. Shaft 28 is adjustable within bore 28a in holding member 28b. It is, of course, to be understood that instead of the connecting and arresting means 27, 28 also other adjusting and locking means may be provided as, for instance, a spring-biased ball snap arrangement.

FIG. 2 shows in dot-dash-lines an adjusted position of the members 24, 25 which corresponds to the employment of a differently dimensioned intermediate member 63. In this last-mentioned position, the angle 21a formed by the three projections of the axes mentioned above will be retained.

Advantageously, the counterwheel 24 is slightly braked whereby the angle 21 may be maintained even more favorable, which is of particular importance when the friction force for the fusing process acts eccentrically. As a brake there may be employed, for instance, a small disc clutch built into the counterwheel 24 and having one part connected to the nonrotatable supporting stud for the counterwheel and another part connected to the counterwheel 24.

Instead of being designed as a gear, the counterwheel 24 may also be designed as a roller resting on the flanks 43 and 44 of the arrangement of FIG. 6, or on the flanks 55 and 56 in conformity with the arrangement of FIG. 7.

The welding or fusing proper is effected by turning the short intermediate member 13 which is provided with outer teeth and forms a part of the pipe. This turning is advantageously effected by turning, in the direction of the arrow 59, a gear 22 meshing with the teeth of member 13. While this turning takes place, the pipes 1 and 2 to be interconnected and displaceable in axial direction to a small extent, are pressed against the end faces of said intermediate member so that the thus created frictional heat will heat the respective engaging end surfaces of said pipes and said intermediate member and will melt and fuse the same, said pipes 1 and 2 being secured against rotation. The axial fitting and pressing of pipes 1 and 2 in the direction of the arrows 96 and 97 (FIGS. 1, 5 to 7, and 9) may be effected, for instance, by two spring-biased clamping collars. The welding or fusing operation is, of course, carried out correspondingly with regard to the embodiments of FIGS. 5 and 6 and the intermediate members 11 and 12.

A further modification of the transmission clamp is shown in FIG. 3. According to this arrangement, three rotatable gears 37, 38, and 39 mesh with the teeth 14 of the cylindrical intermediate member 13. The gears 37, 38 and 39 are journalled in the two legs 7 and 8 of the clamp, which legs have respectively connected thereto arms 9 and 10. A pressure spring 16 urges the two arms 9 and 10 apart so that the gears supported thereby are lightly pressed against the teeth 14 of the intermediate member 13. This favors the intermeshing of the respective teeth.

A still further modification of a transmission clamp is shown in FIG. 4. The transmission clamp illustrated therein also has three axes similar to the arrangement of FIG. 3, but in contradistinction to FIG. 3, two gears have been replaced by two rollers 48 and 49. All other parts correspond to those of FIG. 3 and the operation is also similar to that of the device of FIG. 3.

While the radial centering of the intermediate members 11, 12 and 13 may be effected in various manners, particularly advantageous centering arrangements are shown in FIGS. 5 to 7. According to FIG. 5, the centering of intermediate member 11 is effected by the two gears 22 and 24.

According to FIGS. 6 and 7, the centering of the intermediate members 12 and 13 respectively is effected by a pair of rollers 45, 46; 57, 58.

The radial centering of the non-rotatably held pipes 1 and 2 is, in conformity with FIG. 6, effected by stationary centering members 61, 62, 63 and 64 forming part of the transmission clamp.

According to FIG. 7, the radial centering of the pipes 1 and 2 is effected by guiding lips 53 and 54 of the intermediate member 13.

The axial centering of the driving gears 22, 24 in the arrangement of FIG. 5 is effected by the members 35, 36 carried by the clamp, inasmuch as these members, in case of an axial movement of the clamp, will abut the end faces of the teeth of the intermediate member.

A similar axial centering of the driving gears is, according to FIGS. 6 and 7, effected by the roller bearings 45, 46, 57, 58. If, however, the teeth 14 of the intermediate members 11, 12 and 13 are herringbone teeth, it is, of course, not necessary to provide the axial centering means mentioned above in connection with FIGS. 5, 6 and 7.

Figure 10:
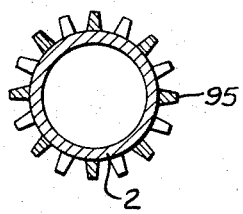
FIGURE 10 is a cross-section along the line X—X of FIGURE 9.

A further modification of centering means for the above-mentioned purpose is shown in FIGS. 9 and 10. According to the arrangement shown therein, the intermediate member 93 is provided with two types of teeth, viz. short teeth 14a having substantially the length of the width of the intermediate member 93, and longer teeth 95 which protrude laterally beyond the end faces of the intermediate member 93. These long teeth 95 engage adjacent outer peripheral portions of the pipes 1 and 2 so as to center the same with regard to the intermediate member 93. This modification, in contrast to the arrangement of FIGS. 5 and 7, avoids the reduction of the inner diameter of the intermediate member for purposes of centering the latter with regard to the pipes 1 and 2. In this instance, the fusing process can be observed between the longer teeth 95. While it would be possible to extend the protruding portions of the teeth all the way around so that the protruding portions would, so-to-speak, form rings, such an arrangement would impair the observation of the fusing. FIG. 9 also shows in schematical representation the means for pressing the tube end 1 and 2 against the intermediate member 93. These means are of the clamp type and include the two-armed levers 101, pivoted at 102 at the ends of a connecting member 103. The free ends of the two-armed levers 101 are subjected to the force of a compression spring 104, arranged therebetween. The inner ends of the levers 101 are clamped to the tubes 102 and transmit thereto the force exerted thereon by the compression spring 104.

Thus, the tube ends 102 will be held in contact with and pressed against, respectively, the intermediate member 93.

The advantages of the present invention are seen primarily in that the fusing surface is geometiracally and mechanically fixed in a proper manner and that the pressing operation will not cause any deformations whereby a properly defined fusing will be made possible over the entire circumference.

Furthermore, an arrangement according to the present invention requires a minimum of space for the tool and greatly facilitates accessibility to parts which are difficult to get at, particularly when the pipes have already been fixedly installed. Drives of the type employed in the prior art, including gear wheels and bearings made up of two halves each may be avoided by the arrangement of the present invention.

The dimensions of the connecting members or fittings may be considerably reduced because the space for a conical sleeve ring and a conical sleeve, is saved. The sleeves of the connecting members do not have to be dimensioned to meet high spreading forces as they may occur with flat conical angles with high transmission ratio.

It is, of course, to be understood that the present invention is, by no means, limited to the particular method, arrangements and modifications shown in the drawings, but also comprises any modifications within the scope of the appended claims.

What we claim is:

1. An annular member of thermoplastic material adapted to be interposed between two pipes of thermoplastic material to be spin-welded to said annular member, which has its outer periphery provided with teeth and has its end faces adjacent the inner periphery thereof provided with laterally outwardly extending annular collars having an outer diameter slightly less than the inner diameter of the pipes to be interconnected by said annular member for centering said annular member relative to the pipes to be interconnected.

2. An annular member of thermoplastic material adapted to be interposed between two pipes of thermoplastic material to be spin-welded to said annular member, which has its outer periphery provided with a first set of teeth of a maximum length corresponding to the width of said annular member and also having its outer periphery provided with a second set of teeth respectively interposed between said first set of teeth but protruding beyond the end faces of said annular member, the inner diameter of the protruding portions of said second set of teeth being slightly in excess of the outer diameter of the pipes to be interconnected whereby said protruding portions are adapted substantially to align said annular member with regard to the pipes to be interconnected.

References Cited

UNITED STATES PATENTS 2,933,428  4/1960  Mueller _____ 156—73

EARL M. BERGERT, *Primary Examiner.*

P. DIER, *Assistant Examiner.*